United States Patent
El Rifai et al.

(10) Patent No.: US 11,952,013 B2
(45) Date of Patent: Apr. 9, 2024

(54) TRUSTED CONTEXT SELF LEARNING METHOD FOR AN IN-VEHICLE NETWORK INTRUSION DETECTION SYSTEM DEVELOPED TO LIMIT CALIBRATION PROLIFERATION AND DEVELOPMENT COSTS

(71) Applicant: GM GLOBAL TECHNOLOGY OPERATIONS LLC, Detroit, MI (US)

(72) Inventors: Mayssaa El Rifai, Novi, MI (US); Samuel B. Kupfer, Oak Park, MI (US); Joseph E. Ploucha, Commerce Township, MI (US); Ron C. Carleton, Macomb, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 665 days.

(21) Appl. No.: 17/160,122

(22) Filed: Jan. 27, 2021

(65) Prior Publication Data

US 2022/0234626 A1  Jul. 28, 2022

(51) Int. Cl.
  *B60W 60/00* (2020.01)
  *G06F 16/955* (2019.01)
  *G06N 20/00* (2019.01)
  *H04L 12/40* (2006.01)

(52) U.S. Cl.
  CPC ... *B60W 60/00188* (2020.02); *G06F 16/9566* (2019.01); *G06N 20/00* (2019.01); *H04L 12/40* (2013.01); *H04L 2012/40215* (2013.01); *H04L 2012/40273* (2013.01)

(58) Field of Classification Search
  None
  See application file for complete search history.

(56) References Cited

U.S. PATENT DOCUMENTS

2019/0126859 A1* 5/2019 Parmar ............. H04L 12/40189
2021/0114606 A1* 4/2021 Alvarez ................. G06N 3/047

\* cited by examiner

*Primary Examiner* — Syed A Roni
(74) *Attorney, Agent, or Firm* — Lorenz & Kopf LLP

(57) ABSTRACT

In various embodiments, methods, systems, and vehicle apparatuses are provided. A method for determining a trusted context of operation by an in-vehicle Network Intrusion Detection System (NIDS) for learning of a vehicle platform, including executing the NIDS to monitor a set of Electronic Control Units (ECUs) and vehicle state elements by receiving a set of vehicle derived inputs about a vehicle's operating state; in response to a determination about the vehicle's operating state, identifying the trusted window during which learning about network topology and whitelisted messages contained in a vehicle platform is allowable; creating a vehicle-specific configuration containing a list of networks of topologies and whitelisted messages in use by the ECUs in the vehicle platform, and preventing misconfiguring of at least one network in the list of network topologies and whitelisted messages of the vehicle-specific configuration in the vehicle platform outside the trusted window.

20 Claims, 5 Drawing Sheets

TRUSTED CONTEXT SELF LEARNING METHOD FOR AN IN-VEHICLE NETWORK INTRUSION DETECTION SYSTEM DEVELOPED TO LIMIT CALIBRATION PROLIFERATION AND DEVELOPMENT COSTS

INTRODUCTION

The present disclosure generally relates to vehicles and security and more particularly relates to methods, systems, and apparatuses assessing the trust levels of a system topology of a vehicle for system configuration or calibration of control units (ECUs) in the vehicle.

In recent years there have seen significant advancements in autonomous and semi-autonomous driving features of inland driven vehicles with complex network and host systems. With complex networks and systems produced in mass production in which there is appreciable variation in the produced electrical content of a completed and manufactured vehicle that requires consideration in security assessments. In the vehicles with more advanced autonomous, semi-autonomous, and related feature options, the multiple system variations are coordinated by different ECUs (Electronic Control Units). While regulatory concerns are aligned with self-driving system classes, there is needed applicability to even a platform that does not support any class of autonomy and will be launched within vehicles that do not support autonomy as well. The autonomous and semi-autonomous vehicle ECUs are internally connected through multiple communication buses enabling the ECUs connected to the bus to read or send data to other ECUs. As a result, if an adversary can compromise one of the ECUs, the adversary can access and exploit the data of other ECUs. The function of an in-vehicle Network Intrusion Detection System (NIDS) is to monitor on-premise environments (in this case a network of ECUs) for suspicious events that could indicate a compromise and to prevent network compromises and intrusions.

To successfully operate a NIDS, the network signal monitoring software must be able to have a precise mapping of the network topology. The network topology mapping consists of details related to the type and number of networks (Controller Area Network, Ethernet, etc.) and details related to which ECUs are located on which networks.

It is desirable to depart from costly and time-consuming calibration processes that have been used to create vehicle specific configurations that contain a list of network topology and messages in use by each ECU that is each part of a unique platform build.

It is desirable to have a system design that is capable of securely self-learning vehicle network topology by monitoring certain ECU network security and vehicle state elements to identify a trusted window during which learning can occur to prevent unauthorized personnel from otherwise accessing and causing a misconfiguration of a vehicle system.

It is desirable to provide a capability to support a secure self-enable of the NIDS in select vehicle sales regions to ensure functionality that conforms with regional data privacy regulations in the region of sales that may differ from a vehicle's assembly locality.

Furthermore, other desirable features and characteristics of the present disclosure will become apparent from the subsequent detailed description and the appended claims, taken in conjunction with the accompanying drawings and the foregoing technical field and background.

SUMMARY

In at least one exemplary embodiment, a method for determining a trusted window by an in-vehicle Network Intrusion Detection System (NIDS) for the learning of a vehicle platform is provided. The method includes: executing, by a processor, the NIDS to monitor a network of Electronic Control Units (ECUs) and vehicle state elements by receiving a set of vehicle inputs about a vehicle's operating state; in response to a determination about the vehicle's operating state, identifying, by the processor, the trusted window during which learning about a network topology and whitelisted messages contained in a vehicle platform is allowable; creating, by the processor, a vehicle-specific configuration containing a list of networks of topologies and whitelisted messages in use on specific networks by the ECUs in the vehicle platform; and preventing, by the processor, misconfiguring of at least one network in the list of network topologies and whitelisted messages of the vehicle-specific configuration in the vehicle platform outside the trusted window based on results from an assessment of at least one security implication of a network topology and whitelist message contained in the list in use by the ECUs in the vehicle platform.

In at least one embodiment, the method includes applying, by the processor, to generate by the algorithm, the network topology, and the whitelist message with behavior associated with the vehicle platform.

In at least one embodiment, the method includes implementing, by the processor, prior available data of network topology generated during the manufacture of a vehicle.

In at least one embodiment, the method wherein the prior available data includes data of ECUs that are part of the vehicle's network topology.

In at least one embodiment, the method wherein the data vehicle's network topology includes ECUs, and controller area network (CAN) bus membership.

In at least one embodiment, the method includes implementing, by the processor, automated learning by the algorithm in the NIDS of a region of sale of a vehicle.

In at least one embodiment, the method includes enabling, by the processor, the NIDS to use leverage pre-existing manufacturing data to extract the region of sale of the vehicle to enable operability of the NIDS in accordance with privacy regulations of a region that the vehicle will be offered for sale.

In at least one embodiment, the method includes extracting, by the processor, via a compact system network configuration file in conjunction with a topology that has been learned to generate at least one whitelist message set for a vehicle build in accordance with whitelist message usage while also making considerations for whitelisting message for OEM aftermarket ECUs to be added during a system life cycle.

In another exemplary embodiment, a system is provided. The system includes a processor configured to execute an in-vehicle Network Intrusion Detection System (NIDS) to monitor a set of Electronic Control Units (ECUs) and vehicle state elements by receiving a set of vehicle inputs about a vehicle's operating state; in response to a determination about the vehicle's operating state, the processor configured to identify the trusted window of allowability to learn about a network topology and whitelisted messages contained in a vehicle platform; the processor configured to create a vehicle-specific configuration containing a list of networks of topologies and whitelisted messages in use by the ECUs in the vehicle platform; and the processor configured to prevent misconfiguring of at least one network in the list of network topologies and whitelisted messages of the vehicle-specific configuration in the vehicle platform outside the trusted window based on results from an assessment of at least one security implication of a network topology and whitelist message contained in the list in use by the ECUs in the vehicle platform.

In at least one exemplary embodiment, the processor is configured to implement the algorithm to generate the network topology and the whitelist message with behavior associated with the vehicle platform.

In at least one exemplary embodiment, the processor is configured to implement prior available data of network topology that is generated during a manufacture of a vehicle.

In at least one exemplary embodiment, wherein the prior available data includes data of ECUs that are part of the vehicle's network topology.

In at least one exemplary embodiment, wherein the data vehicle's network topology includes, but is not limited to, controller area network (CAN) bus locations.

In at least one exemplary embodiment, the processor is configured to implement automated learning using the algorithm in the NIDS of a region of sale of a vehicle.

In at least one exemplary embodiment, the processor is configured to extract, via a compact system network configuration file in conjunction with a topology that has been learned, at least one whitelist message set for a vehicle build in accordance with whitelist message usage.

In yet another exemplary embodiment, a vehicle apparatus is provided. The vehicle apparatus includes: a vehicle controller which includes a processor wherein the processor implements an algorithm to determine a trusted window by an in-vehicle Network Intrusion Detection System (NIDS) to learn about a vehicle platform, including execution of the NIDS to monitor a set of Electronic Control Units (ECUs) and vehicle state elements by receipt of a set of vehicle inputs about a vehicle's operating state; in response to a determination about the vehicle's operating state, identify the trusted window during which to learn about a network topology and whitelisted messages contained in a vehicle platform is allowable; create a vehicle-specific configuration that contains a list of networks of topologies and whitelisted messages in use by the ECUs in the vehicle platform; and prevent misconfiguring of at least one network in the list of network topologies and whitelisted messages of the vehicle-specific configuration in the vehicle platform outside the trusted window based on results from an assessment of at least one security implication of a network topology and whitelist message contained in the list in use by the ECUs in the vehicle platform.

In at least one exemplary embodiment, the vehicle apparatus includes the processor configured to: generate via the algorithm the network topology and the whitelist message with behavior associated with the vehicle platform.

In at least one exemplary embodiment, the vehicle apparatus includes the processor configured to: implement prior available data of network topology generated during the manufacture of a vehicle.

In at least one exemplary embodiment, the vehicle apparatus includes the processor configured to: implement automated learning by the algorithm in the NIDS of a region of sale of a vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
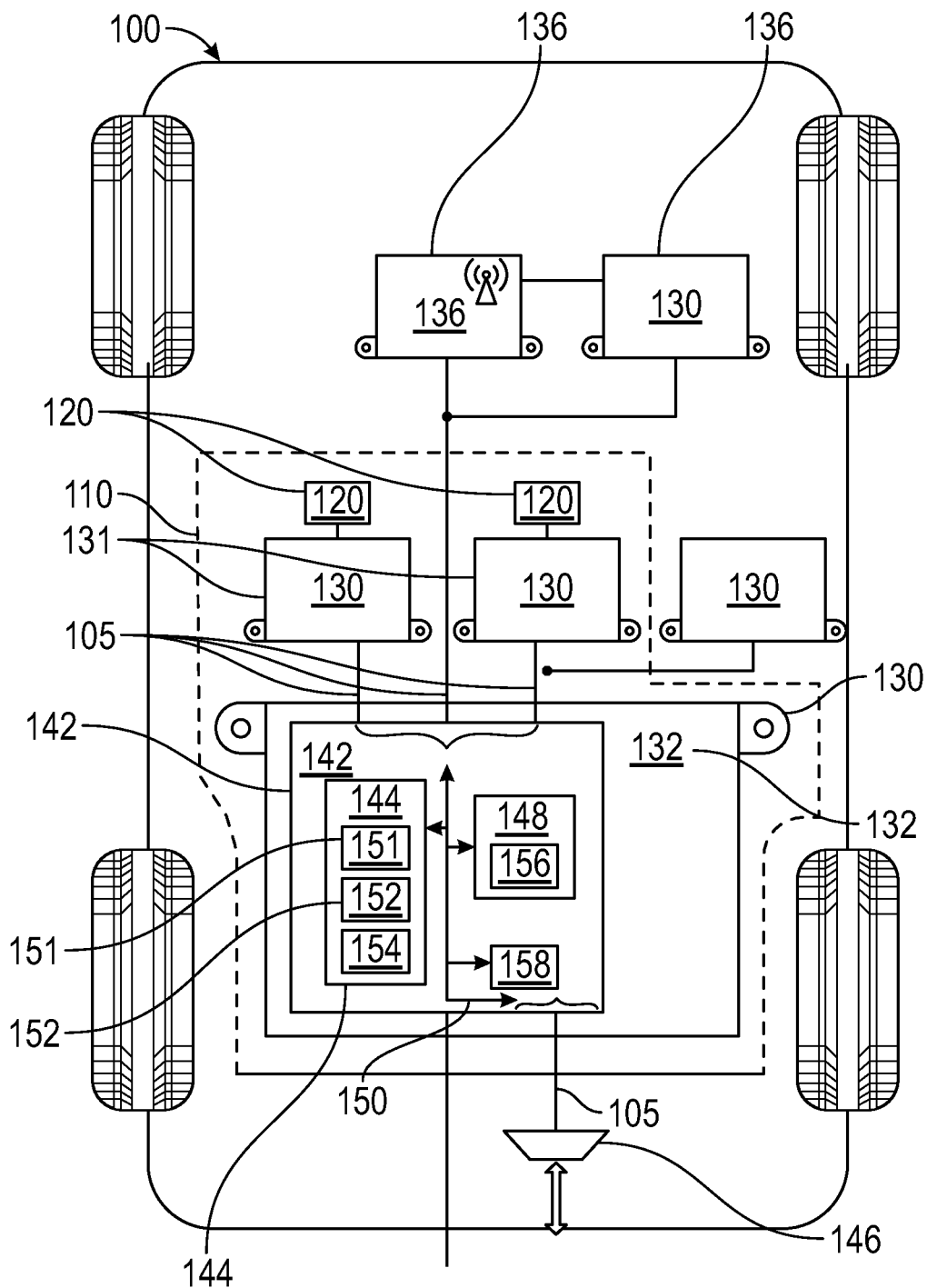
FIG. 1 is a functional block diagram illustrating an autonomous or semi-autonomous vehicle having a NIDS configured with an intelligent identification algorithm that enables control of vehicle ECU calibrations and other configurations based on using a set of parameters to assess a trusted context in which vehicle calibration may occur, in accordance with exemplary embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The NIDS may host signal processing and identification algorithms to distinguish a baseline operation of network protocol and system behaviors from deviations so as to facilitate the identification of targeted system behavior violations. The intrusion detection can be implemented to prevent malicious network traffic activities such as the hacking of vehicle systems and manipulating of configuration data.

The present disclosure describes methods, systems, and apparatuses that provide constraints calibration proliferation and development work on a per-platform basis with respect to vehicle system information needed to support the Network intrusion detection system functionality. The present disclosure describes methods, systems, and apparatuses that provide a self-learning algorithm that generates configuration data needed for the proper operation of a NIDS while using Original Equipment Manufacturer (OEM) specific manufacturing processes and ECU states to generate a trusted context for learning.

FIG. 1 is a functional block diagram illustrating an autonomous or semi-autonomous vehicle having a NIDS configured with an (i.e. intelligent) identification algorithm that enables control of vehicle ECU calibrations and other configurations based on using a set of parameters to assess a trusted context in which vehicle calibration may occur, in accordance with exemplary embodiments.

FIG. 1 illustrates an embodiment of an autonomous type of vehicle 100 in which an identification algorithm assessing a set of parameters or factors to determine a trusted context for gateway access to ECU configurations of vehicle systems. While it is contemplated that the disclosed subject matter is implemented in systems of an autonomous type of vehicle 100 other ways of deploying the disclosed subject are also feasible. For example, it is entirely possible for the subject matter to be deployed in or integrated into systems or equipment of other types of vehicles that may or may not be autonomous or remote devices such as drones.

With a reference to FIG. 1, the vehicle 100 having a network 105 (i.e. an all in-vehicle network) self-configuration processor system (inputs, ECU flags, vehicle states, ECUs, Sensors and sensor data, calibration data, etc. . . . ) 110 is shown in accordance with exemplary embodiments. Vehicle 100 includes a plurality of sensors 120, sensor ECUs 131, general ECUs 130, and a trusted network self-configuration module 132 of the trusted network self-configuration processor system 110.

The trusted network self-configuration processor system 110 for an in-vehicle NIDS avoids the need for costly calibration proliferation methods by enabling build processes and the ECU states unique to the vehicle manufacturing processes and new, compact network design artifacts hosting critical network information required by the system. The trust assessed for the context of the network self-configuration processor system 110 is critical in lieu of a proliferation of vehicle-specific, signed calibrations.

The level of trust for the trusted, network self-configuration processor system 110 is determined by a set of determinations, checks, or assessments of results of security assessments (or security implications) that include assessing parameters or attributes of the following: (1) ECU level flags, security tokens, or counters used to indicate production processes are possible, (2) ECU privileged access status such as Security Access level and (3) vehicle mileage to be≤a critical threshold for a vehicle to be distinguished as new such that the system recognizes the value and can imply the vehicle exists in a trusted OEM manufacturing environment; and in the trusted environment the NIDS can (4) securely ingest network topology information generated during the vehicle manufacturing process to ID which ECUs exist and on which network(s) it can be determined to generate a (5) baseline white list of in-vehicle network platform-specific content using the learned topology information of (4) in conjunction with (6) a new compact system configuration ARXML file that identifies all possible ECUs and messages and associated performance behaviors.

In an exemplary embodiment, a trusted assessment to learn the saleable region of the system to only (or nearly only, or as much as possible) enable the system functionality in markets where data collection would be compliant with regional regulatory mandates. Also, other additional customer-specific enable criteria could also be used in conjunction with this enable flag. In that regard, this is an initial 'enable' flag that would need to be AND'd with other information, say a customer allowing data to be collected as a choice. The trust assessment leverages the existing manufacturing process and trust model by appending a (7) a saleable region code to a canonical server name, for example, which is configured to support telematic communication ECU 136 and which can be programmed based on the intended region of sale. Whereas the canonical URL name may provide no parseable region of sale data without otherwise needing additional lookup tables and configurations, the use of (7) the saleable region code in conjunction with (8) telematics system provides user Terms and Conditions acceptance to permit the NIDS to maintain agility with respect to a system for the current dynamic global environment with respect to data privacy and offboarding vehicle data.

This assessment of the trusted context eliminates the dependency on using staff resources and time-consuming calibration methods to provide the information needed for the functionality of an in-vehicle NIDS to support creating a baseline definition of each unique vehicle build configuration.

In an exemplary embodiment, the network self-configuration processor system 110 does not require calibration NIDS configuration tables as the automatic learn algorithm that is implemented creates a trusted environment in lieu of dependence security provided by signed calibration files.

In an exemplary embodiment, the network self-configuration processor system 110 relies on prior or legacy security elements that are available but have been repurposed or designed to create the context that defines a trusted window required for learning system configurations.

In an exemplary embodiment, the network self-configuration processor system 110 implements a compact system network configuration file extract 151 that is enabled for use in conjunction with system topology learned information to generate vehicle build specific "whitelisted" message sets with associated message performance. System configuration files can be 100's of MBs in size and contain all possible messages that any vehicles manufactured or assembled may have for all protocols, the extract is on the order of 10's of kilobytes in size and can be used within the program memory 144 of a modern embedded system (e.g. microcontroller).

In an exemplary embodiment, the whitelisted messages are the only messages if they do transmit on a vehicle network within the trusted context window can be considered as normal or baseline occurrences.

In an exemplary embodiment, the messages that are not part of the whitelisted messages but are part of an overall system configuration ARXML and are considered abnormal and will be flagged by the NIDS as prima facie violations, without respect to any other performance considerations.

In an exemplary embodiment, the network self-configuration processor system 110 can enable processes to leverage the use of legacy or existing ECU designs and vehicle manufacturing processes to learn canonical telematic server URL names to securely and easily receive the explicit region of sale at build time without additional programming time or ECU calibration memory partitions required.

In an exemplary embodiment, the network self-configuration processor system 110 binds the NIDS operation to as-built data and enables the NIDS to determine if it is allowed to log and offload data in accordance with regional data privacy laws.

In an exemplary embodiment, the network self-configuration processor system 110 defines mechanisms by which the learned in-vehicle network configuration information and can be used to verify the legitimacy of certain approved aftermarket ECUs which can be added to the in-vehicle networks while also adapting the vehicle whitelist to add the new messages while also being able to detect tampering of previously learned configurations.

The sensors sense observable conditions of the vehicle 100 and can include, but are not limited to, image, lidar, and radar sensors 120. Generally, each sensor of the plurality of sensors is specifically is coupled to the trusted network self-configuration processor module (communication gateway controller) 132 of the vehicle 100 and configured to sense external surroundings of the vehicle 100. The trusted network self-configuration processor module 132 receives sensor signals generated by the sensors 120 and provided by sensor ECUs 131, processes the sensor signals to obtain sensor data. Although the depicted embodiment realizes a platform as a vehicle 100, the concepts presented here can be deployed in other platforms, such as aircraft, spacecraft, watercraft, motorcycles, robots, robotic devices, and the like. Moreover, the concepts presented here may also be deployed in alternative mobile and non-mobile platform applications, if so desired.

As mentioned, the vehicle 100 generally includes a plurality of sensors 120, sensor ECUs 131, general ECU devices 130, and software, sufficient for ingesting digital information and/or sensing information, converting the sensed information into digital information, and providing the digital information to the network self-configuration processor system 110. Generally, each sensor of the plurality of sensors is configured to sense aspects of the surroundings of the vehicle 100.

Outside of the trusted manufacturing context, the network self-configuration processor system 110 if configured, can allow data to be exfiltrated via 136 if in a designated region, and also incorporate additional consumer approval as an additional input to permit data collection. The transceiver 136 can be used to establish and maintain the communications links to onboard components and external communication sources to be used to provide additional data, such as customer terms and conditions acceptance need to complete the activation of the NIDS. The transceiver 136 can perform signal processing (e.g., digitizing, data encoding, modulation, etc.) as is known in the art and this instance for the temporal data received sent, and received.

With continued reference to FIG. 1, the components of the network self-configuration processor system 110 and their functions are described. In the depicted embodiment, the computer system of the network self-configuration processor system 110 includes networks 105, ECUs 130, an extra vehicle communication interface 146, and a communication gateway controller 132 with a block data processor 142 communicatively coupled to a memory 144, a storage device 148, an interprocessor bus 150, and an optional storage disk 158. In various embodiments, the network self-configuration processor system 110 performs actions and other functions described further below in connection with FIG. 2. The block data processor 142 performs the computation and control functions attributed to the network self-configuration processor system 110 and may include any type of module or multiple modules, single integrated circuits such as a micro module, or any suitable number of integrated circuit devices and/or circuit boards working in cooperation to carry out the described operations, tasks, and functions by manipulating electrical signals representing data bits at memory locations in the system memory, as well as other processing of signals.

During operation, the block data processor 142 loads and executes one or more programs, algorithms, and rules embodied as instructions and applications (i.e. the learning algorithm) 152 contained within the memory 144 and, as such, controls the general operation of the control system of the communication gateway controller 132. In executing the processes described herein, the block data processor 142 loads and executes at least a program 156.

A computer-readable storage medium, such as a memory 144, a storage device 148, or an optional storage disk 158 may be utilized as both storage and a scratchpad. The memory locations where data bits are maintained are physical locations that have particular electrical, magnetic, optical, or organic properties corresponding to the data bits. The memory 144 can be any type of suitable computer-readable storage medium. For example, memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the block data processor 142. In the depicted embodiment, the memory 144 stores the above-referenced instructions and applications 152 along with one or more configurable variables in stored values 154.

The storage device 148 is a computer-readable storage medium in the form of any suitable type of storage apparatus, including direct access storage devices such as hard disk drives, flash systems, floppy disk drives, and optical disk drives. In one exemplary embodiment, the storage device 148 includes a program product from which memory 144 can receive a program 156 that executes one or more embodiments of one or more processes of the present disclosure. In another exemplary embodiment, the program product may be directly stored in and/or otherwise accessed by the memory 144 and/or a disk (e.g., optional storage disk 158), such as that referenced below.

The data records may be stored in the computer-readable storage medium, such as the memory 144, the storage device 148, or the optional storage disk 158. The internal buses 150 of 132 serve to transmit programs, data, status, and other information or signals between the various components of the computer system of the network self-configuration processor of system 110. The bus 150 can be any suitable physical or logical means of connecting computer systems and components. This includes, but is not limited to, direct hard-wired connections, fiber optics, infrared and wireless bus technologies. During operation, program 156, stored in memory 144, is loaded and executed by the block data processor 142.

The interface 146 may also include one or more network interfaces to allow 110 to communicate with technicians and/or manufacturing systems to permit communication with and potential storage of manufacturing-specific state information which ultimately can be placed into storage apparatuses, such as the storage device 148.

In various embodiments, vehicle 100 is autonomous or semi-autonomous, and the control system of the communication gateway controller 132, and/or components thereof, are incorporated into the vehicle 100. The vehicle 100 is, for example, a vehicle that is automatically controlled to carry passengers from one location to another. The vehicle 100 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

Figure 2A:
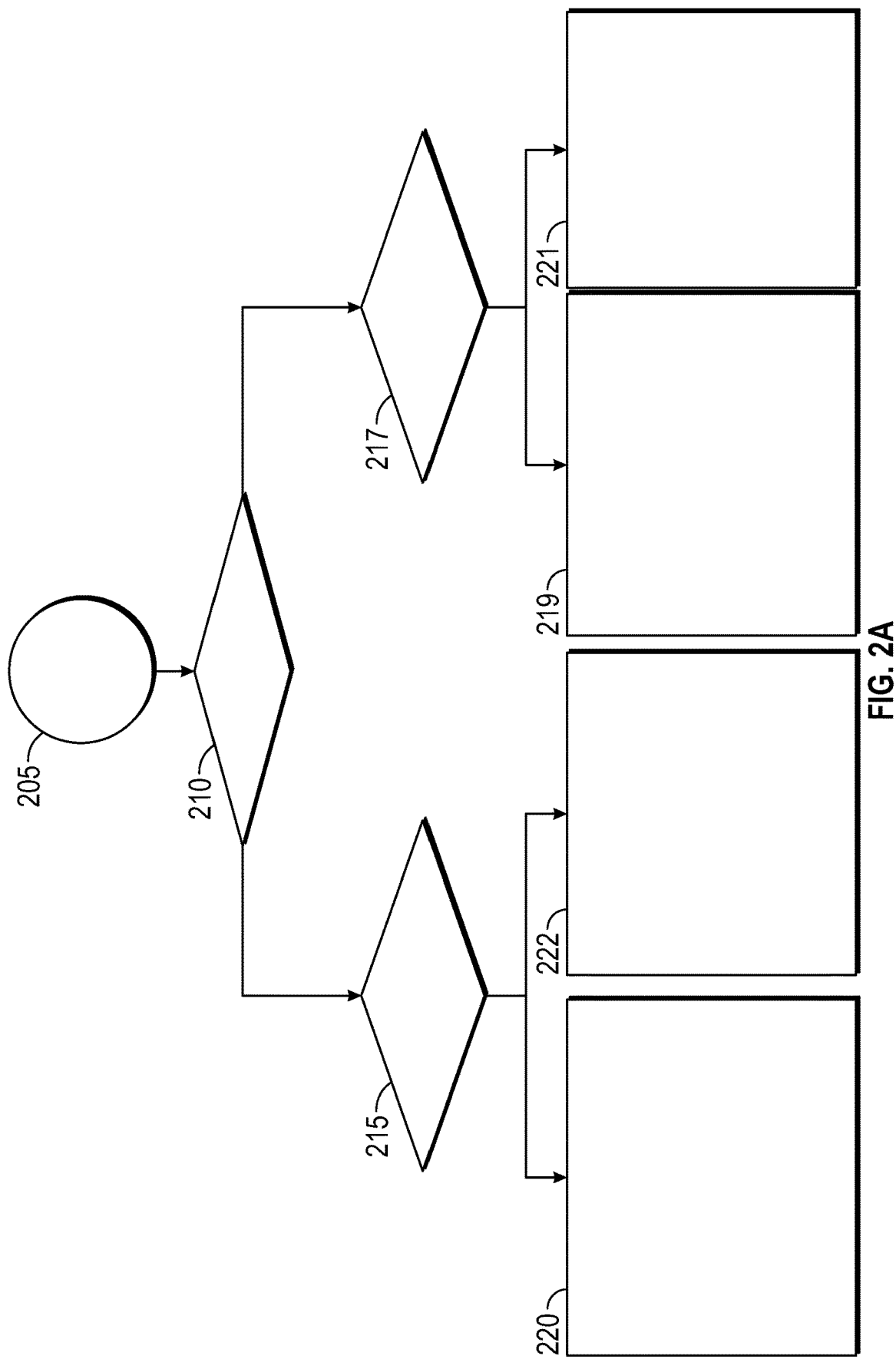
FIGS. 2A, 2B, and 2C are flow diagrams illustrating steps of an autonomous or semi-autonomous vehicle having a NIDS configured with an intelligent identification algorithm that enables control of vehicle ECU calibrations and other configurations based on using a set of parameters to assess a trusted context in which vehicle calibration may occur, in accordance with exemplary embodiments.
Figure 2B:
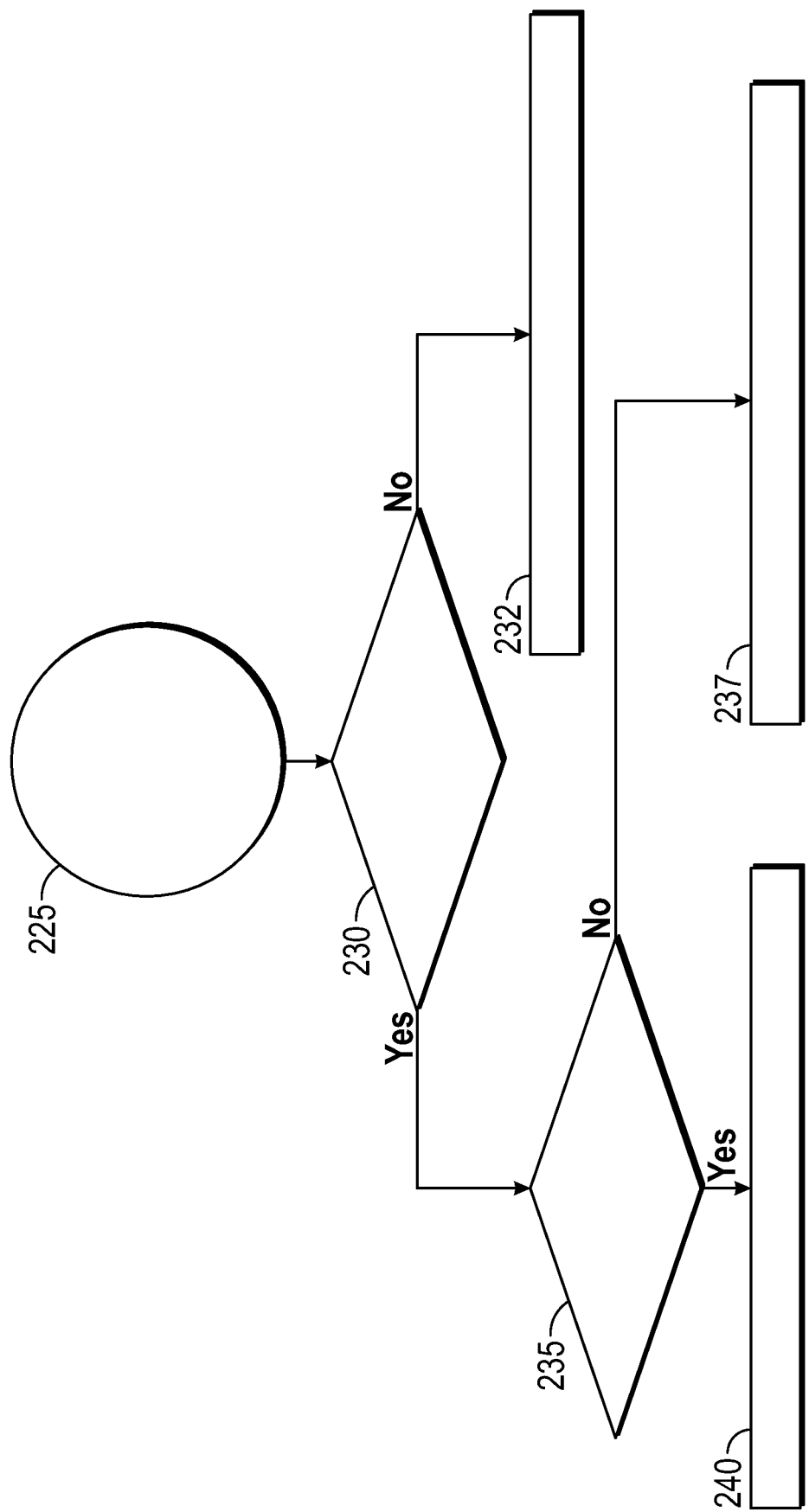
Figure 2C:
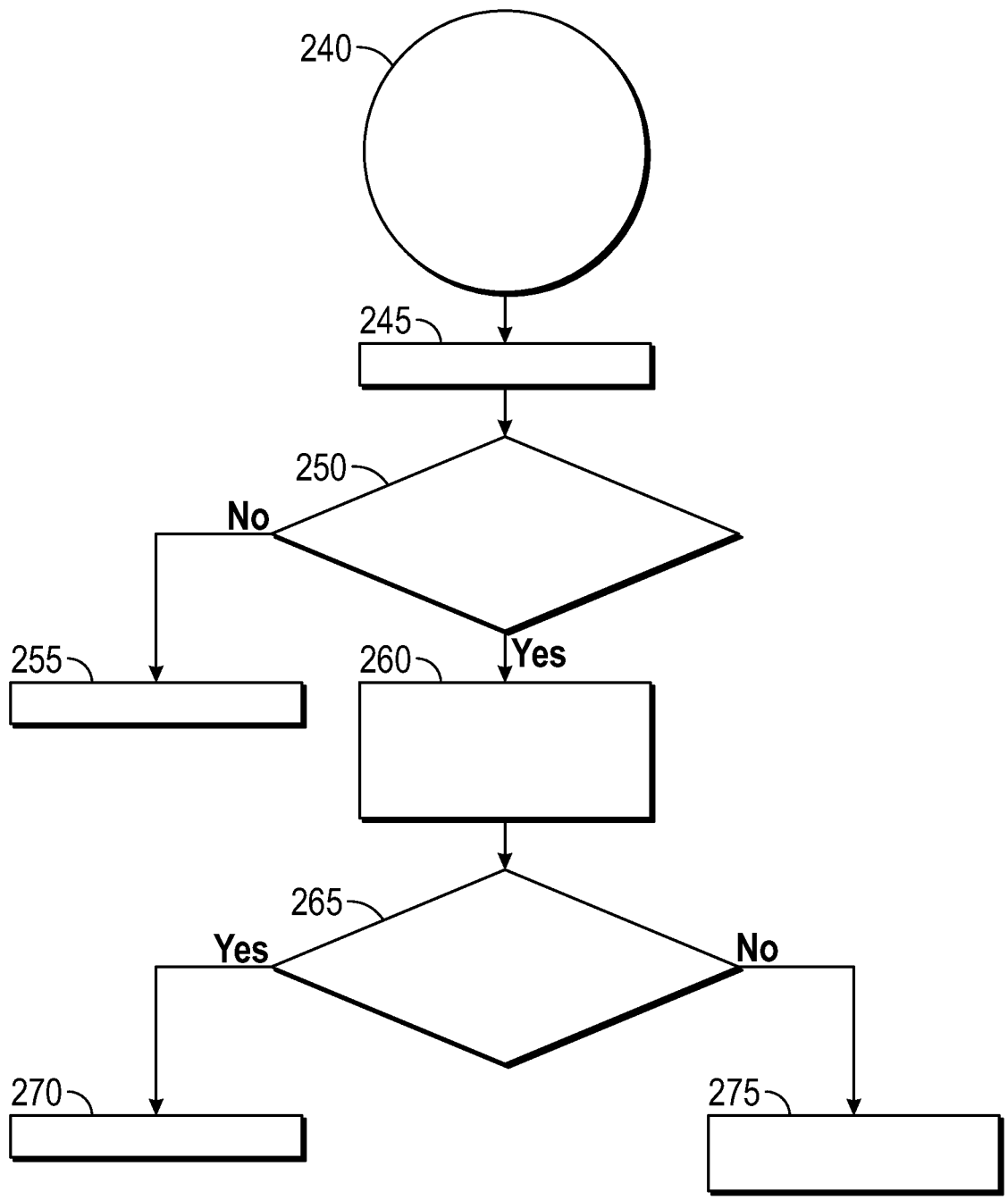

With reference now to FIGS. 2A, 2B and 2C, FIGS. 2A-2C are flow diagrams illustrating steps of an autonomous or semi-autonomous vehicle having a NIDS configured with an intelligent identification algorithm that enables control of vehicle ECU calibrations and other configurations based on using a set of parameters to assess a trusted context in which vehicle calibration may occur, in accordance with exemplary embodiments, in accordance with various embodiments.

In FIG. 2A, at step 205, the network self-configuration processor system 110 executes the NIDS algorithm to initiate the automatic vehicle 100 specific network message learning algorithm. When the NIDS configuration is implemented, the NIDS enables data collection of the various ECU associated systems of the vehicle 100. In an eight-step (See description in FIGS. 2A-2B) self-configuration assessment process, at task 210, the network self-configuration processor system 110 performs a check or assessment by the algorithm via the central communication gateway module using a manufacturing status indication to determine whether a configuration value is greater than >0. If it is determined at task 210 that the value is >0 or true then the security access is determined to be active. The security access sub-function status check of the vehicle mileage to a certain determined low number which is a critical threshold for a vehicle being considered used. The function check implements are ((security access=active sub-function, and odometer value≤predetermined or a variable set low number of km)). This is associated with steps 2-3 of the eight-step self-configuration assessment.

Alternately, if the configuration value at task 210 is not>0 (the check is false) then the flow proceeds to task 215 for a status check of the vehicle mileage is below a preset amount (i.e. 100 km, 75 km, 50 km, etc.) Again, this corresponds to steps 2-3 of the eight-step process flow. In an exemplary embodiment, at task 215, if the check of the vehicle mileage is ≤100 km, the flow proceeds to step 4 to at task 220 learn the network topology data in the trusted environment, and to steps 5-6 to initiate the vehicle NIDS network message whitelist learn sub-algorithm (step 5) based on the learned content (step 4) and the NIDS system configuration file extract (Step 6), a new compact sub-set of specific system configuration ARXML data used to support automatic learning of vehicle-specific network. Alternately, if the result of task 215 is false, the flow proceeds to task 222 and determines that the vehicle is not located in the manufacturing plant and is prevented from learning the topology information and to initiate the vehicle NIDS network message whitelist learned sub-algorithm (corresponding to steps 4-6 of the eight-step process flow).

At task 217, (steps 2-3) if the status check of the vehicle mileage is ≤100 km and security access equals the manufacturing privilege level and this is deemed true then at task 219 (like task 217) learn the network topology data in the trusted environment, and to steps 5-6 to initiate the vehicle NIDS network message whitelist learn sub-algorithm (step 5) based on the learned content (step 4) and the NIDS system configuration file extract (Step 6), a new compact sub-set of specific system configuration ARXML data used to support automatic learning of vehicle-specific network. Alternately, if the result of task 217 is false, the flow proceeds to task 221 and determines that the vehicle is not located in the manufacturing plant and is prevented from learning the topology information and to initiate the vehicle NIDS network message whitelist learned sub-algorithm (corresponding to steps 4-6 of the eight-step process flow). The system is implied to exist in a trusted OEM manufacturing environment during which the NIDS can securely ingest network topology information generated during the vehicle manufacturing process to ID which ECUs exist and on which network(s) it is a member. Hence, the system generates at step 5, a baseline white list of in-vehicle network platform-specific content using the learned topology information from step 4 (based on the learned context) in conjunction with step 6 of a new compact system configuration ARXML file (e.g., ARXML (AUTOSAR XML) files are used for the designing system, its configuration, its transportation and storing the information. This facilitates the reusability of Software component (SWC) from one system to another) that identifies all possible ECUs and messages and associated performance behaviors.

With reference to FIG. 2B, the flow proceeds to task 225 to receive signed calibration containing the region of sale code data. Corresponding step 7 of the eight-step process, at task 230, a determination is made as to whether the region corresponding to the region code allows the collection of data. In other words, if the data collection proposed is allowed under privacy governance of the locality for the region. If it is deemed allowable, the flow proceeds to make another check or determination at task 235 (corresponding to the final step, step 8 of the eight-step process), to check whether the Terms Conditions and Privacy Statement (TCPS) is accepted. If it is deemed true, then the data collection is allowed, the NIDS is allowed to collect and offload data depending on operating conditions set in the NIDS state in a manner in which it is capable to send data to the back office. If at task 235, the TCPS is not accepted, then the data collection is not allowed. The NIDS is set to a state to prohibit the data collection and to not collect data until conditions are changed.

With reference to FIG. 2C, at task 240, once the NIDS configuration is completed, the NIDS is allowed to collect data. At task 245 the CAN frame or message is received. At task 250, the CAN frame or message is checked or evaluated as to whether it is included in the NIDS extracted list of frames or messages. If it is not found in the list, then at task 270, it is deemed a violation. Alternately, if it is on the list, then flow at task 260 checks the CAN frame or message against a set of normal behavior. At task 265, a determination is made whether the frame violates the normal behavior. If it is deemed that it does, then the flow proceeds to mark the traffic that consists of the CAN frame or message with a violation. If not, then the flow proceeds to task 275, and the traffic is marked as normal. Hence, the NIDS through the set of tasks implements mechanisms by which it learns the in-vehicle network configuration information and verifies the legitimacy of certain approved aftermarket ECUs which can be added to the in-vehicle networks while also adapting the vehicle whitelist to add the new messages and being able to detect tampering of previously learned configurations.

Figure 3:
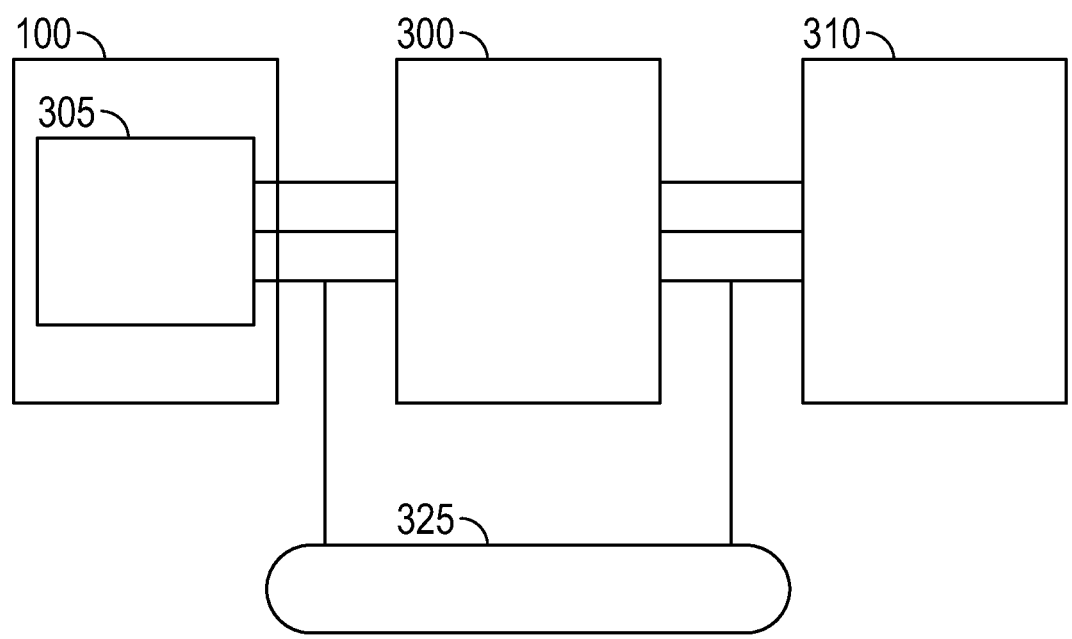
FIG. 3 is a block diagram illustrating a gateway in communication with a set of ECUs of an autonomous or semi-autonomous vehicle and external ECUs with a NIDS configured with an intelligent identification algorithm that enables gateway access and control of vehicle ECU calibrations and other configurations based on using a set of parameters to assess a trusted context in which vehicle calibration may occur, in accordance with exemplary embodiments.

FIG. 3 is a block diagram illustrating a central communication gateway module 300 in communication with a set of ECUs 305 of an autonomous or semi-autonomous vehicle and external manufacturing and diagnostic systems 310 with the NIDS of central communication gateway module of 300 configured with an intelligent identification algorithm that enables central gateway access (via buses and bus locations 325) and control of vehicle ECU calibrations of 300 and other configurations based on using a set of parameters to assess a trusted context in which vehicle secured, self-learning may occur, in accordance with exemplary embodiments. The central communication gateway module 300 handles direct and inter-ECU or routed communications, enabling data exchanges among all the in-vehicle ECUs in addition to enabling external communications of manufacturing and diagnostic networks of 310 to pass through the central communication gateway module 300 via sets of buses and bus locations 325. The central communication gateway module 300 is a common gateway, which converts data from one bus format to another bus format (i.e. containing an architecture of different types of data buses).

In an exemplary embodiment, the present disclosure describes an algorithm that is implemented by a processor to determine a trusted context of operation by an in-vehicle Network Intrusion Detection System (NIDS) for learning of a vehicle platform. The processer executes the NIDS using an algorithm to monitor a set of Electronic Control Units (ECUs) and vehicle state elements by receiving a set of vehicle inputs about a vehicle's operating state. In response to a determination about the vehicle's operating state, the processor can identify the trusted window during which learning about network topology and whitelisted messages contained in a vehicle platform build configuration is allowable. The processor can also create a vehicle build-specific configuration containing a list of topologies of networks and whitelisted messages in use by the set of ECUs in each vehicle platform build configuration. The processor can prevent an undocumented misconfiguring of at least one network in the list of networks of topologies and whitelisted messages of the vehicle-specific configuration in the vehicle platform outside the trusted window based on results from an assessment of at least one security implication of a network of a topology and whitelist message contained in a list in use by the set of ECUs in the vehicle platform. The processor implements the algorithm to associate a set of topologies of networks and the whitelisted messages with behavior associated with the vehicle platform-specific build or manufacture. The processor can also use elements of prior available data of network topology generated for a vehicle platform network design.

The prior or previously available data includes ECU data that includes network instances, network segmentation configurations, ECU network memberships, frame routing, network message address translation, and frame signal routing definitions that are part of the vehicle's network topology. The prior available data includes bus data. The implementing automated learning by the processor is determined by the algorithm in the NIDS based on a region of sale of a vehicle.

The processor implements the NIDS to use or make readily available existing calibration files otherwise it enables an unparseable canonical, region-specific URL to extract the region of sale of the vehicle to enable operability of the NIDS in accordance with privacy regulations of a region that the vehicle has been offered for sale.

The processor extracts via a compact system network configuration file in conjunction with a topology that has been learned to generate at least one whitelist message set for a vehicle build in accordance with whitelist message usage.

In various exemplary embodiments, the algorithm 152 of FIG. 1 that is implemented can be created in offline training derived from supervised or unsupervised learning processes and can be enabled using neural networks. For example, the neural networks may include trained convolutional neural network (CNN) and/or recurrent neural network (RNN) in which a similar methodology can be applied and used in vehicle control operations.

In an exemplary embodiment, the algorithm may be implemented as a dynamic neural network that is trained during a training mode before use or provisioned in the vehicle (or other vehicles). Once the dynamic neural network is trained, it may be implemented in a vehicle (e.g., the vehicle 100 of FIG. 1) in an operational mode, in which the vehicle is operated in an autonomous, semi-autonomous or manual manner.

In various alternative exemplary embodiments, it will be appreciated that the neural network may also be implemented in both the training mode and the operational mode in a vehicle and trained during an initial operation period in conjunction with operations of a time delay or like methodology for torque control predictions. Also, a vehicle may operate solely in the operating mode with neural networks that have already been trained via a training mode of the same vehicle and/or other vehicles in various embodiments.

As mentioned briefly, the various modules and systems described above may be implemented as one or more machine learning algorithms or models that undergo supervised, unsupervised, semi-supervised, or reinforcement learning. Examples of such algorithms include, without limitation, artificial neural networks (ANN) (such as a recurrent neural network (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naïve Bayes), principal component analysis (PCA), support vector machines (SVM), clustering models (such as K-nearest-neighbor, K-means, expectation-maximization, hierarchical clustering, etc.), and linear discriminant analysis models.

It should be appreciated that process of FIGS. 1-3 may include any number of additional or alternative tasks, the tasks shown in FIGS. 1-3 need not be performed in the illustrated order and process of the FIGS. 1-3 may be incorporated into a more comprehensive procedure or process having additional functionality not described in detail herein. Moreover, one or more of the tasks shown in FIGS. 1-3 could be omitted from an embodiment of the process shown in FIGS. 1-3 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for determining a trusted context of operation by an in-vehicle Network Intrusion Detection System (NIDS) for learning of a vehicle platform, comprising:
   executing, by a processor, the NIDS using an algorithm to monitor a set of Electronic Control Units (ECUs) and vehicle state elements by receiving a set of vehicle inputs about a vehicle's operating state;
   in response to a determination about the vehicle's operating state, identifying, by the processor, a trusted window during which learning about network topology and whitelisted messages contained in a vehicle platform build configuration is allowable, wherein the identifying is based on a vehicle mileage and a security access status associated with manufacturing;
   creating, by the processor, a vehicle build-specific configuration containing a list of topologies of networks and whitelisted messages in use by the set of ECUs in each vehicle platform build configuration; and
   preventing, by the processor, an undocumented misconfiguring of at least one network in a list of networks of topologies and whitelisted messages of the vehicle-specific build configuration in the vehicle platform outside the trusted window based on results from an assessment of at least one security implication of a network of a topology and whitelist message contained in a list in use by the set of ECUs in the vehicle platform.

2. The method of claim 1, further comprising:
   generating, by the algorithm, the topologies of networks and the whitelisted messages with behavior associated with a vehicle platform-specific build.

3. The method of claim 2, further comprising:
   implementing elements of prior available data of network topology generated for a vehicle platform network design.

4. The method of claim 3, wherein the prior available data comprises ECU data comprised of network instances, network segmentation configurations, ECU network memberships, frame routing, network message address translation, and frame signal routing definitions that are part of the vehicle's network topology.

5. The method of claim 4, further comprising:
   implementing automated learning, by the algorithm in the NIDS, of a region of sale of a vehicle.

6. The method of claim 5, further comprising:
   enabling the NIDS either to use existing calibration files to make readily available, or to enable an unparseable canonical region-specific Uniform Resource Locator (URL) to extract the region of sale of the vehicle to enable operability of the NIDS in accordance with privacy regulations of a region that the vehicle has been offered for sale.

7. The method of claim 6, further comprising:
   extracting, by the processor, via a compact system network configuration file in conjunction with a topology that has been learned to generate at least one whitelist message set for a vehicle build in accordance with whitelist message usage.

8. The method of claim 3, wherein the prior available data comprises bus data.

9. A system comprising:
   a processor configured to execute an in-vehicle Network Intrusion Detection System (NIDS) with an algorithm to monitor a set of Electronic Control Units (ECUs) and vehicle state elements by receiving a set of vehicle inputs about a vehicle's operating state;
   in response to a determination about the vehicle's operating state, the processor configured to identify a trusted context of allowability to learn about network topologies and whitelisted messages contained in a vehicle platform-specific build, wherein the trusted context is based on a trusted window that is identified based on a vehicle mileage and a security access status associated with manufacturing;
   the processor configured to create a vehicle-specific configuration containing a list of networks of topologies and whitelisted messages in use by the set of ECUs in the vehicle platform-specific build; and
   the processor configured to prevent misconfiguring of at least one network in the list of network topologies and whitelisted messages of the vehicle-specific configuration in the vehicle platform outside the trusted context window based on results from an assessment of at least one security implication of a network of a topology and whitelist message contained in a list in use by the set of ECUs in the vehicle platform-specific build.

10. The system of claim 9, further comprising:
    the processor to implement the algorithm to generate the network topologies and the whitelist messages with behavior associated with the vehicle platform.

11. The system of claim 10, further comprising:
    the processor configured to implement prior available data of network topology that is generated during a manufacture of a vehicle.

12. The system of claim 11, wherein the prior available data comprises data of ECUs that are part of the vehicle's network topology.

13. The system of claim 12, wherein data comprises controller area network (CAN) ECU bus memberships.

14. The system of claim 13, further comprising:
    the processor configured to implement automated learning using the algorithm in the NIDS of a region of sale of a vehicle.

15. The system of claim 14, further comprising:
    the processor configured to extract, via a compact system network configuration file in conjunction with a topology that has been learned, at least one whitelist message set for a vehicle platform-specific build in accordance with whitelist message usage.

16. A vehicle apparatus comprising:
    a vehicle controller comprising a processor wherein the processor implements an algorithm to determine a trusted window by an in-vehicle Network Intrusion Detection System (NIDS) to learn about a vehicle platform, comprising:

execute the NIDS to monitor a set of Electronic Control Units (ECUs) and vehicle state elements by receipt of a set of vehicle inputs about a vehicle's operating state;

in response to a determination about the vehicle's operating state, identify the trusted window during which to learn about a network topology and whitelisted messages contained in a vehicle platform is allowable, wherein the identifying is based on a vehicle mileage and a security access status associated with manufacturing;

create a vehicle-specific configuration that contains a list of networks of topologies and whitelisted messages in use by the set of ECUs in the vehicle platform; and prevent misconfiguring of at least one network in the list of network topologies and whitelisted messages of the vehicle-specific configuration in the vehicle platform outside the trusted window based on results from an assessment of at least one security implication of a network of a topology and whitelist message contained in a list in use by the set of ECUs in the vehicle platform.

17. The vehicle apparatus of claim 16, further comprising:
the processor configured to:
generate via the algorithm the network topology ECU memberships and the whitelist messages with behavior associated with a vehicle platform-specific build.

18. The vehicle apparatus of claim 17, further comprising:
the processor configured to:
implement prior available data of network topology generated during a manufacture of a vehicle.

19. The vehicle apparatus of claim 18, further comprising:
the processor configured to:
implement automated learning by the algorithm in the NIDS of a region of sale of a vehicle.

20. The vehicle apparatus of claim 19, further comprising:
the processor configured to:
enable the NIDS to use readily available data to extract the region of sale of the vehicle to enable operability of the NIDS in accordance with privacy regulations of a region that the vehicle has been offered for sale.

* * * * *